US008630725B2

(12) United States Patent
Yoo et al.

(10) Patent No.: US 8,630,725 B2
(45) Date of Patent: Jan. 14, 2014

(54) RECORDING MEDIUM HAVING A DATA STRUCTURE FOR MANAGING SOUND DATA AND RECORDING AND REPRODUCING METHODS AND APPARATUS

(75) Inventors: Jea Yong Yoo, Seoul (KR); Kang Soo Seo, Anyang-si (KR); Byung Jin Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1491 days.

(21) Appl. No.: 10/927,085

(22) Filed: Aug. 27, 2004

(65) Prior Publication Data

US 2005/0149214 A1 Jul. 7, 2005

Related U.S. Application Data

(60) Provisional application No. 60/542,859, filed on Feb. 10, 2004.

(30) Foreign Application Priority Data

Jan. 6, 2004 (KR) .................. 10-2004-0000634

(51) Int. Cl.
*G06F 17/00* (2006.01)

(52) U.S. Cl.
USPC ........................................................... 700/94

(58) Field of Classification Search
USPC ............................................. 463/35; 700/94
See application file for complete search history.

(56) References Cited

U.S. PATENT DOCUMENTS

| | | | |
|---|---|---|---|
| 4,445,187 A | | 4/1984 | Best |
| 5,537,141 A * | | 7/1996 | Harper et al. ................. 725/116 |
| 5,682,511 A | | 10/1997 | Sposato et al. |
| 5,923,627 A * | | 7/1999 | Miwa et al. ................... 386/262 |
| 6,167,189 A * | | 12/2000 | Taira et al. ....................... 386/95 |
| 6,314,556 B1 * | | 11/2001 | DeBusk et al. ................ 717/107 |
| 6,453,420 B1 * | | 9/2002 | Collart ............................ 726/26 |
| 6,453,459 B1 * | | 9/2002 | Brodersen et al. ............ 717/100 |
| 6,483,983 B1 * | | 11/2002 | Takahashi et al. .............. 386/46 |
| 6,642,939 B1 * | | 11/2003 | Vallone et al. ................. 715/721 |
| 6,643,798 B2 * | | 11/2003 | Barton et al. .................... 714/25 |
| 6,825,875 B1 * | | 11/2004 | Strub et al. ............... 348/207.99 |
| 6,895,171 B1 * | | 5/2005 | Taira et al. ....................... 386/95 |
| 6,925,594 B2 * | | 8/2005 | Dutta et al. ................... 715/205 |

(Continued)

FOREIGN PATENT DOCUMENTS

| | | |
|---|---|---|
| EP | 1 463 052 | 9/2004 |
| EP | 1 608 165 | 12/2005 |
| JP | 2001275089 | * 5/2001 |
| JP | 2001-275089 | 10/2001 |

OTHER PUBLICATIONS

Ikeda provisional drawings, now patent No. 7729598.*
Ikeda provisional specification, now patent No. 7729598.*

(Continued)

*Primary Examiner* — Paul McCord
(74) *Attorney, Agent, or Firm* — Harness, Dickey & Pierce, P.L.C.

(57) ABSTRACT

In the data structure of recording medium for managing sound data associated with graphic information, an interactive composition segment is provided. The interactive composition segment includes sound management information. The sound management information is associated with a graphic item and provides an identifier of a sound data in sound file, separate from a main data file, to reproduce in association with the graphic item.

17 Claims, 12 Drawing Sheets

(56) References Cited

U.S. PATENT DOCUMENTS

| | | | |
|---|---|---|---|
| 6,951,516 B1* | 10/2005 | Eguchi et al. | 463/40 |
| 7,032,236 B1* | 4/2006 | Ozkan et al. | 725/39 |
| 7,113,694 B2* | 9/2006 | Kim et al. | 386/95 |
| 7,200,836 B2* | 4/2007 | Brodersen et al. | 717/100 |
| 7,245,719 B2* | 7/2007 | Kawada et al. | 380/201 |
| 7,293,227 B2* | 11/2007 | Plastina et al. | 707/E17.02 |
| 2001/0052127 A1* | 12/2001 | Seo et al. | 725/55 |
| 2002/0082730 A1* | 6/2002 | Capps et al. | 700/94 |
| 2002/0095415 A1* | 7/2002 | Walker et al. | 707/9 |
| 2002/0112226 A1* | 8/2002 | Brodersen et al. | 717/140 |
| 2003/0005442 A1* | 1/2003 | Brodersen et al. | 725/44 |
| 2003/0025737 A1* | 2/2003 | Breinberg | 345/801 |
| 2004/0056894 A1* | 3/2004 | Zaika et al. | 345/762 |
| 2004/0235520 A1* | 11/2004 | Cadiz et al. | 455/557 |
| 2004/0268269 A1* | 12/2004 | Breinberg | 715/851 |
| 2005/0105888 A1* | 5/2005 | Hamada et al. | 386/95 |
| 2005/0234983 A1* | 10/2005 | Plastina et al. | 707/104.1 |
| 2006/0045481 A1* | 3/2006 | Yahata et al. | 386/95 |
| 2006/0050088 A1* | 3/2006 | Yahata et al. | 345/638 |
| 2006/0153532 A1* | 7/2006 | McCrossan et al. | 386/95 |
| 2006/0188223 A1* | 8/2006 | Ikeda et al. | 386/95 |
| 2006/0248105 A1* | 11/2006 | Goradia | 707/102 |
| 2007/0003220 A1* | 1/2007 | Hamasaka et al. | 386/95 |

OTHER PUBLICATIONS

Translation and Drawings of U.S. Appl. No. 60/443,876 corresponding to Ikeda: 2006/0188223.*
International Search Report dated Aug. 3, 2005.
Office Action for corresponding European Application No. 04 774 410.37-2223 dated May 8, 2008.
Jim Taylor, "DVD Demystified—Second Edition," MacGraw-Hill 2001.
European Office Action dated Dec. 22, 2008.
Office Action for European patent application No. 04774410.7 dated Feb. 7, 2011.

* cited by examiner

FIG. 3

```
Interactive_Composition_Segment () { segment_type
    segment_length
    composition_number
    UO_mask_Table
    page_sound_id                    ⟶  for page sound
    .........
    button () {
      button_number
        neighbor_info () {
            upper_button_number      ⎫
            upper_button_sound_id    ⎪
            lower_button_number      ⎪
            lower_button_sound_id    ⎬  ex. 1
            left_button_number       ⎪  for directional button sound
            left_button_sound_id     ⎪
            right_button_number      ⎪
            right_button_sound_id  } ⎭
        normal_state_info () { }
        selected_state_info () {
            ..........
            voice_sound_existence    ⎱  for voice sound
            voice_sound_id           ⎰
            ............
            default_sound_id
            from_button1_number      ⎫
            from_button1_sound_id    ⎬  ex. 2
            from_button2_number      ⎪  for directional button sound
            from_button2_sound_id    ⎭
            ......... }
        actioned_state_info () { }
      }
}
```

US 8,630,725 B2

RECORDING MEDIUM HAVING A DATA STRUCTURE FOR MANAGING SOUND DATA AND RECORDING AND REPRODUCING METHODS AND APPARATUS

CROSS-REFERENCE TO RELATED APPLICATIONS

This application claims the benefit of priority on Korean Application No. 10-2004-0000634 filed on Jan. 6, 2004 which is hereby incorporated by reference in its entirety.

DOMESTIC PRIORITY INFORMATION

This application claims the benefit of priority under 35 U.S.C. §119 on U.S. Provisional Patent Application 60/542,859, filed Feb. 10, 2004.

BACKGROUND OF THE INVENTION

1. Field of the Invention

The present invention relates to high density recording media such as read-only blu-ray discs (BD-ROM) and methods and apparatuses associated therewith.

2. Discussion of Related Art

Generally, an optical disk on which a large capacity of data is recordable is widely used as an optical record medium. Recently, many efforts have been made to develop a new high density optical record medium (HD-DVD) on which video data of high definition and audio data of high quality can be recorded and stored, such as a blu-ray disk (hereinafter abbreviated BD) and the like.

The blu-ray disk (BD) as a next generation HD-DVD technology is the next generation optical recording solution enabling storage of data that remarkably surpasses previous DVDs. The technology specifications of global standards for the BD are being established together with other digital equipment standards.

Although many efforts have been made to develop optical reproducing players adopting the BD specifications, there are many difficulties in developing a complete optical reproducing player since the BD specifications have not been fully established yet.

Particularly, for effective reproduction of data from the Blu-ray Disc (BD), menu information must be organized and provided so that through interaction with the user, selective data reproduction may take place. However, in the present Blu-ray Disc (BD) standards, because consolidated standards of the supplementary data, particularly the menu information are not complete yet, there are many restrictions on the development of a Blu-ray Disc (BD) optical reproducing apparatus. This becomes problematic in providing menu sounds in association with, for example, menu items.

SUMMARY OF THE INVENTION

A recording medium according to the present invention includes a data structure for managing sound data associated with graphic information.

In one embodiment, the recording medium stores an interactive composition segment. The interactive composition segment includes sound management information. The sound management information is associated with a graphic item and provides an identifier of a sound data in a sound file, separate from a main data file, to reproduce in association with the graphic item. For example, in one embodiment the graphic item is a graphic button. More specifically, the graphic button may be a graphic button after selection by user input. The graphic button may also be a graphic button after activation by user input.

In one embodiment, sound information includes a first identifier identifying a first sound data to reproduce in association with a first graphic item and a second identifier identifying a second sound data to reproduce in association with a second graphic item In another embodiment, the interactive composition segment includes graphic management information for managing reproducing of graphic information that includes the graphic item. For example, the interactive composition segment may includes a button data structure providing the graphic management information on a graphic button as the graphic item and providing the sound management information.

In a further embodiment of the present invention, the recording medium stores the main data file and the separate sound file. For example, the main data file is audio/video data.

The present invention further provides apparatuses and methods for recording and reproducing the data structure according to the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 illustrates a data structure for managing graphic information and associated sound data according to one embodiment of the present invention;

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts. While terms used in the present invention are possibly selected from currently well-known terms, terms are arbitrarily chosen by the applicant in some cases and their meanings are explained in detail in the following description. Hence, the present invention should be understood with the meanings of the corresponding terms chosen by the applicant instead of the simple names of the terms.

Figure 1:
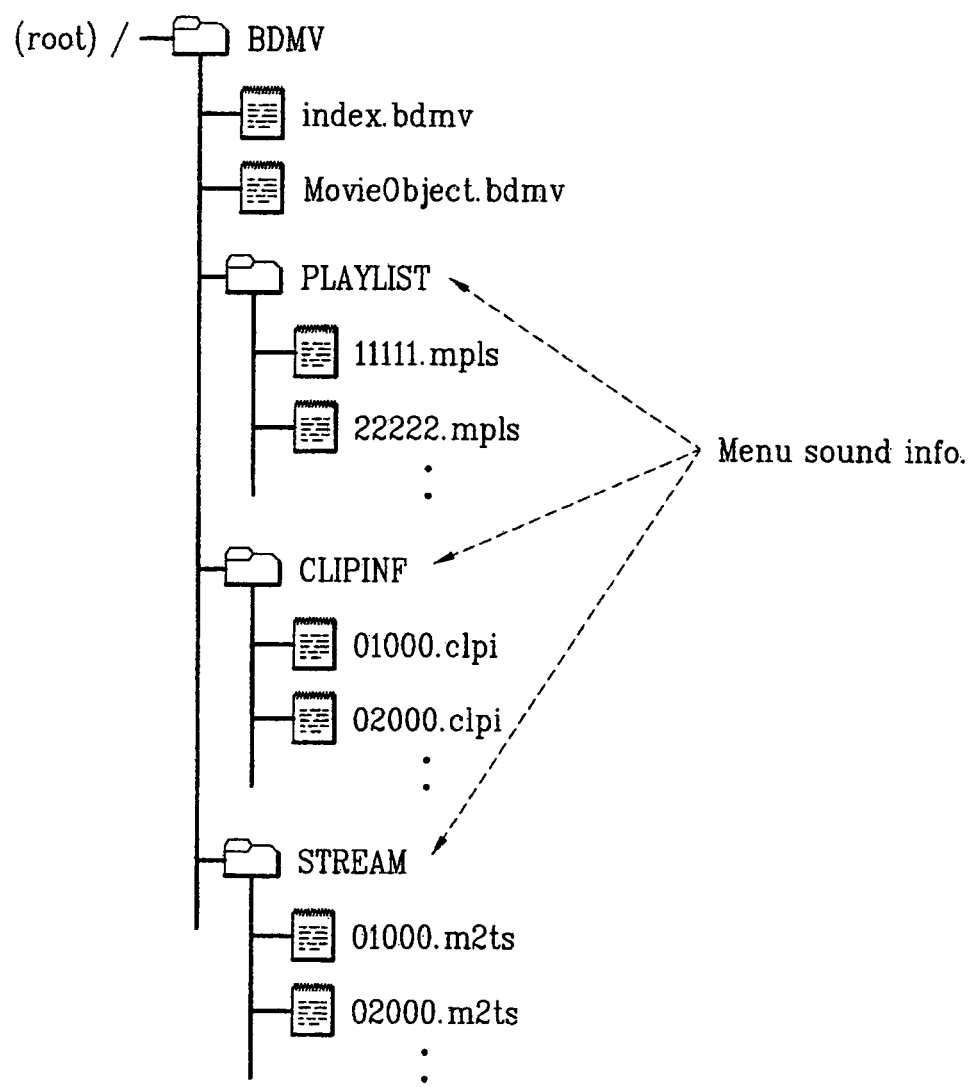
FIG. 1 illustrates a file structure of a high density optical disc in accordance with one embodiment of the present invention.

First, the file structure and recording medium format for data playback management adopted by the present invention will be explained in detail by referring to FIG. 1 and FIG. 2 below. FIG. 1 illustrates a file structure of a high density optical disc in accordance with one embodiment of the present invention. As shown, the file structure includes at least one BD directory BDMV under a root directory. In the BD directory BDMV, an index file index.bdmv and an object file MovieObject.bdmv are included as general file (upper file) information. Moreover, three directories, which have playback management and navigation information for the data recorded on the recording medium (e.g., a Blu-ray Disc) are recorded in the BD directory BDMV. The three directories are a playlist directory PLAYLIST, a clip information directory CLIPINF, and a stream directory STREAM. The three directories and the files included therein will be explained in detail below.

Files for video and audio streams, which are called an 'AV stream', are recorded according to specific formats in the stream directory STREAM. For instance, '*.m2ts' is used as each extension name of AV stream files (e.g., 01000.m2ts and 02000.m2ts) since the AV stream files are generally recorded as MPEG2 transport packets. In the BD specification, the AV stream is named a clip stream file.

Also, in the present invention, as discussed in more detail below, an interactive graphics stream providing graphic data may be multiplexed with an AV stream. An interactive graphic stream provides, for example, graphic data containing one or more graphic items. For example, the graphic data may represent a menu with one or more menu items. The graphic stream is interactive in that a user provides input, for example via a remote control, on which graphic item is selected and whether to execute or activate the selected graphic item (e.g., activate a sub-menu or function indicated by a selected menu item).

In association with the interactive graphic stream, the present invention may provide one or more sounds. The sound data for these sounds may be multiplexed along with the interactive graphic stream and AV stream. Alternatively, the sound data for each sound are stored in a separate sound file, separate from the AV stream files, on the recording medium. Management and reproduction of the sound data in the sound file will be discussed in detail below.

The clipinfo directory CLIPINF consists of clipinfo files 01000.clpi and 02000.clpi having a one-to-one correspondence with the AV stream files (*.m2ts), respectively. Specifically, attribute information and timing information of an AV stream are recorded in the corresponding clipinfo file (*.clpi). The timing information includes information on mapping a presentation time stamp (PTS) of data in the AV stream file to a source packet number of a source packet in the AV stream file. Typically this map is referred to as an entry point map. In the BD standard, the AV stream file *.m2ts and the corresponding clipinfo file *.clpi are collectively called a "clip". Accordingly, the file "01000.clpi" in the clipinfo directory CLIPINF has attribute information and timing information on the file "01000.m2ts" in the stream directory, and the files "01000.clpi" and "01000.m2ts" form a clip.

The playlist directory PLAYLIST includes playlist files (*.mpls), and each of the playlist files (*.mpls) includes at least one playitem designating a playing interval of a specific clip. The playitem has navigation information on a play starting time (In-Time) and play end time (Out-Time) of a particular clip desired to play, i.e., designated by the clip name given in a Clip_Information_File field in the playitem. Moreover, the playlist file *.mpls may be provided with a subplayitem as necessary, such as when data is to be played non-synchronized with the playitem.

In the BD directory BDMV, there are an index file index.bdmv and an object file Object.bdmv as general files for securing user interactivity. The index file index.bdmv includes an index table index Table having main menu information and title information the user can select.

Particularly, the main menu information recorded in the index Table is called a main menu or a top menu. In relation to this, and as discussed in some detail above, the present invention provides an interactive graphic stream representing, for example, a menu with one or more user selectable and/or executable menu items. The present invention further introduces sounds associated with these operations. For example, the present invention introduces graphic, or more specifically menu, sounds. A menu sound may be a simple sound provided when a user selects a menu item to call a user's attention to or to prevent error in menu selection. Similarly, a menu sound may be a simple sound provided when a user activates a menu item. In the present invention, a button sound refers to a sound provided when a graphic or menu item represented by a graphic button is selected and/or activated. Or, the button sound may represent movement of selection from one button to another. Other sounds managed according to the present invention include a page sound provided when a user turns a menu page, and a voice sound (e.g., a spoken message) provided, for example, as a menu sound. The data structures and method of managing menu sounds as a specific, but not limiting example of graphic sounds, will be described in detail below.

Figure 2:
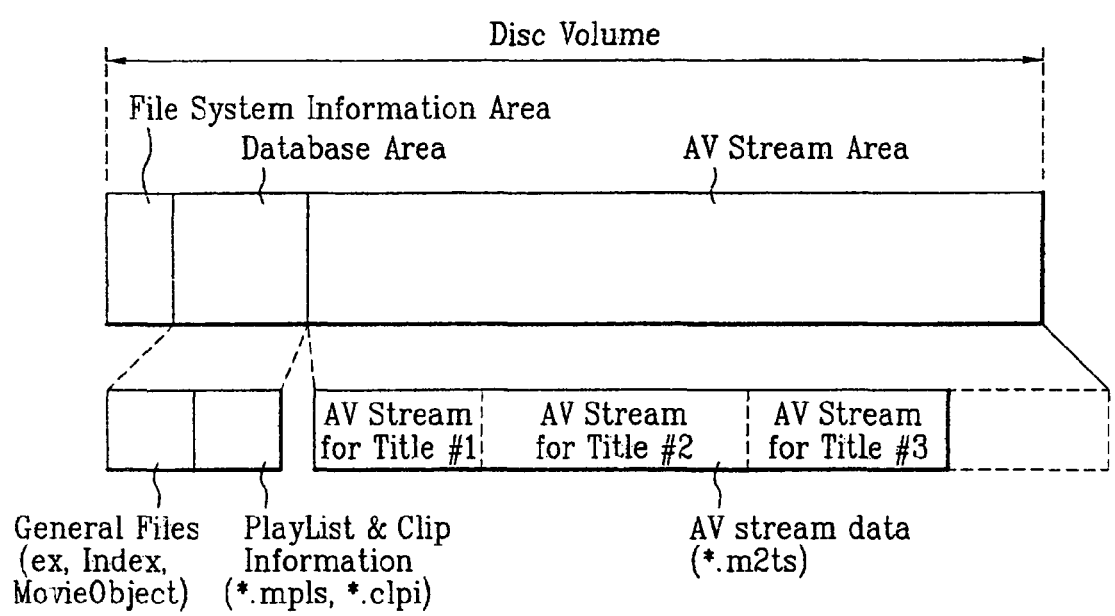
FIG. 2 schematically illustrates a disc volume for storing the file structure of FIG. 1 in accordance with an embodiment of the present invention.

As shown in FIG. 2, the disc volume of a BD-ROM is organized into a file system information area, a database area, and an A/V stream area. The file system information area stores system information for managing the disc. The database area includes a general files area and a playlist and clip information area. The general files area stores general files such as the index.bdmv file and the MovieObject.bdmv file. The playlist and clip information area stores the PLAYLIST directory and the CLIPINF directory. The main data and the supplementary data, such as audio/video/graphic, recorded thereon are stored as the MPEG2 transport stream formatted clip files (*.m2ts) in the A/V stream area.

FIG. 3 illustrates a data structure for managing graphic information and associated sound data according to one embodiment of the present invention. The data structure is called an interactive composition segment (ICS), and may be recorded in an AV stream file (*.m2ts) with which the ICS is associated.

As mentioned in the foregoing description, an ICS consists of graphic and sound information for configuring an interactive graphic image and associated sound data for interaction with a user. As shown in FIG. 3, the ICS includes a segment type field, a segment length field, a composition number indicator, a UO mask table field, and a page sound identifier. The segment type field indicates that this segment is an ICS. The length field indicates the length of the ICS, and the composition number indicates the number of updates of a graphic composition (e.g., image) that this ICS represents. The UO mask table is a data structure for indicating forbidden user operations with respect to this ICS. The UO mask table will be described in greater detail below with respect to FIG. 9. The page sound identifier identifies a sound data in the sound file to reproduce when this page of graphic information is reproduced.

The ICS also includes one or more button information data structures button ( ). FIG. 3 illustrates the data structure of one button ( ). As shown, the button information for a button ( ) includes a button number button_number, serving as a unique identifier of this button ( ). The button information for the button ( ) further includes neighbor button information 'neighbor_info( )' having information of neighboring buttons displayed in the image managed by the ICS, normal state information 'normal_state_info( )' of the button, selected state information 'selected_state_info( )' of the button, and actioned or activated state information 'actioned_state_info' of the button.

The neighbor button information includes the identifiers (i.e., the button number) of upper, lower, left and right buttons (e.g., upper_button _number, lower_button_number, left_button_number and right_button_number), if any, with reference to the present current button that appear in a image managed by the ICS. A user may supply movement input on which button to select such as move up, move down, move left and move right. When this input is received, the button associated with the input movement is accessed using the identifier given in the neighbor button information. For example, if move up input is received, then the upper button identifier is used to access the button information for the button identified by the upper button identifier. Furthermore, a sound associated with the movement may be reproduced based on sound information in the neighbor button information. As shown in FIG. 3, in association with each neighbor button the neighbor button information provides a sound identifier (e.g., upper_button_sound_id, lower_button_sound_id, right_button_sound_id, and left_button_sound_id) that identifies a sound data (e.g., provides an address of the sound data, provides an identifier in the sound data, etc.) in the sound file to reproduce when user movement input for that neighbor button is received. If a particular neighbor button does not exist, then the button identifier for that neighbor button will contain a predetermined value (e.g., the identifier of the current button) to indicate that a button of the corresponding direction fails to exist.

The normal state information provides graphic management information for reproducing a graphic image of the button in a normal state; the normal state being other than the selected or activated state. The selected state information includes management information for reproducing a graphic image of the button in a selected state; namely, when a user selects the button through user input. As shown, the selected state information also includes a 'voice_sound_existence' field indicating whether a voice sound exists for reproduction when this button is selected by a user. And, if the voice sound exists, as shown in FIG. 3, the identifier of the voice sound data is provided in the 'voice_sound_id' field. Because the voice sound may have a relatively longer reproduction time than that for the button or page sounds, by having information voice_sound_existence, an optical record playback apparatus is provided with sufficient warning to read out the voice sound data, particularly when the voice sound data is multiplexed with the interactive graphic stream and main AV data.

As further shown in FIG. 3, the selected state information includes a default sound identifier default_sound_id and several directional button and sound identifiers. The default sound identifier identifies the sound data in the sound file to reproduce when this button is selected. However, the user may have selected a different button and then entered movement input to move from the selected button to this button. When movement input is received while a button is in the selected state, instead of reproducing the sound provided by the neighbor button information, a sound is reproduced using one of the several directional sound identifiers in the selected state information. For each button that a user may move to this button from, an button identifier and sound identifier is provided (e.g., from_button1_number and from_button1_sound_id, respectively).

The activated state information 'actioned_state_information' includes the same information as the selected state information, but for when the button is activated by the user, generally, after having been selected by the user. Also, the activated state information includes one or more command, instructions, etc. to execute the function associated with the activated button. For example, the commands may cause processing to proceed to an ICS for reproducing a sub-menu.

Furthermore, in some applications, another sound information may be utilized instead of using the page sound information separately. For instance, in case of switching to a new page, the selected sound information default_sound_id within the selected state information selected_state_info( ) may be utilized as the page sound information page_sound_id.

Next, several examples of managing the reproduction of sound data based on the above-described data structure will be explained with reference to FIGS. 4-12.

Figure 4:
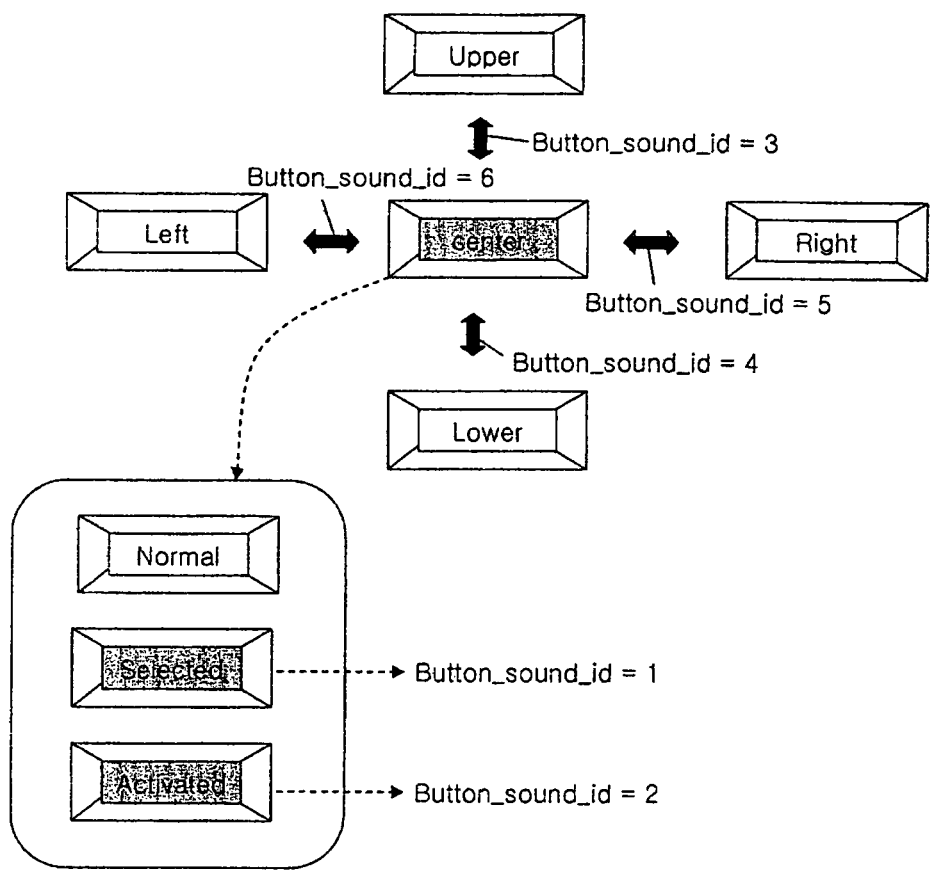
FIG. 4 illustrates a graphics page (e.g., a graphic display on a screen) reproduced using the management information provided by an ICS according to an embodiment of the present invention.

FIG. 4 illustrates a graphics page (e.g., a graphic display on a screen) reproduced using the management information provided by an ICS according to an embodiment of the present invention. As shown, the graphic page includes five graphic items. More specifically, the graphic page is a menu having five menu items. Each of the five menu items is a graphic button, which is a kind of icon provided on a screen for interactivity with a user. For simplicity and with reference to the data structure described above with respect to FIG. 3, the five buttons are labeled center, upper, lower, left and right. As will be appreciated, the button labels represent the directional relationship of the button in the graphic page with respect to the center button, which for the purposes of this example is the current button. However, it should be appreciated that in most practical applications, the buttons will have labels, drawings, text, etc. that represent their functionality. The ICS includes a button ( ) data structure for each of the five buttons. The upper, lower, left and right buttons are depicted in the normal state. Namely, the graphic management information in the normal state information of each button ( ) identifies the image of the button in the interactive graphics stream to display as the normal state button. The center button is depicted in the selected state. Accordingly, the graphic management information in the selected state information of the center button ( ) identifies the image of the button in the interactive graphics stream to display as the selection center button. Once the user activates the corresponding button, a specific program or sub-menu operates as commanded by the corresponding button.

FIG. 4 also illustrates the sound identifiers given in the neighbor button information associated with each button.

Namely, when a cursor operated by a user's direction moves to the upper button from the center button, and vice versa, 'button_sound_id=3' is given as the upper_button_sound_id in the center button's neighbor button information and as the lower_button_sound_id in the upper button's neighbor button information. When the cursor moves to the lower button from the center button, and vice versa, 'button_sound_id=4' is given as the lower_button_sound_id in the center button's neighbor button information and as the upper_button_sound_id in the lower button's neighbor button information. When the cursor moves to the right button from the center button, and vice versa, 'button_sound_id=5' is given as the right_button_sound_id in the center button's neighbor button information and as the left_button_sound_id in the right button's neighbor button information. When the cursor moves to the left button from the center button, and vice versa, 'button_sound_id=6' is given as the left_button_sound_id in the center button's neighbor button information and as the right_button_sound_id in the left button's neighbor button information.

Hence, the data structure according to the present invention may provide a separate button sound according to each moving direction when a the cursor moves to neighbor button, thereby enabling to call a user's attention to a menu selection. Moreover, by providing different button sounds to a visually disabled user, the optical disk can be more conveniently utilized. The data structure according to the present invention also allows for providing an identical button sound for each moving direction.

Besides sounds for movement between buttons, the data structure allows for providing sounds associated with states of a button. The button states are mainly classified into three kinds. In a 'normal state' where a location of the cursor has nothing to do with the corresponding button no sound is generally provided. If the cursor is located on the corresponding button that button may be considered to be in a selected state. As shown in FIG. 4, sound data in the sound file identified by button_sound_id=1, which is given in the default_sound_id field in the selected state information for this button, is reproduced. As will be appreciated, locating a cursor on a button is not the only method for selecting a button, and numerous other types of user input may be used to select a button without departing from the present invention.

If a selected button is, for example, clicked by a user (e.g., using a remote control), the button enters the activated state. Accordingly, the graphic management information in the activated state information of the button is used to identify the activated button image in the interactive graphics stream and display the activated button image. The commands in the activated state information are executed to perform a function or functions associated with the activated button. As shown in FIG. 4, here sound data identified by button_sound_id=2, which is given in the default_sound_id field in the activated state information for this button, is also reproduced. As will be appreciated, clicking on a selected button is not the only method for activating a button, and numerous other types of user input may be used to activate a button without departing from the present invention.

Figure 5:
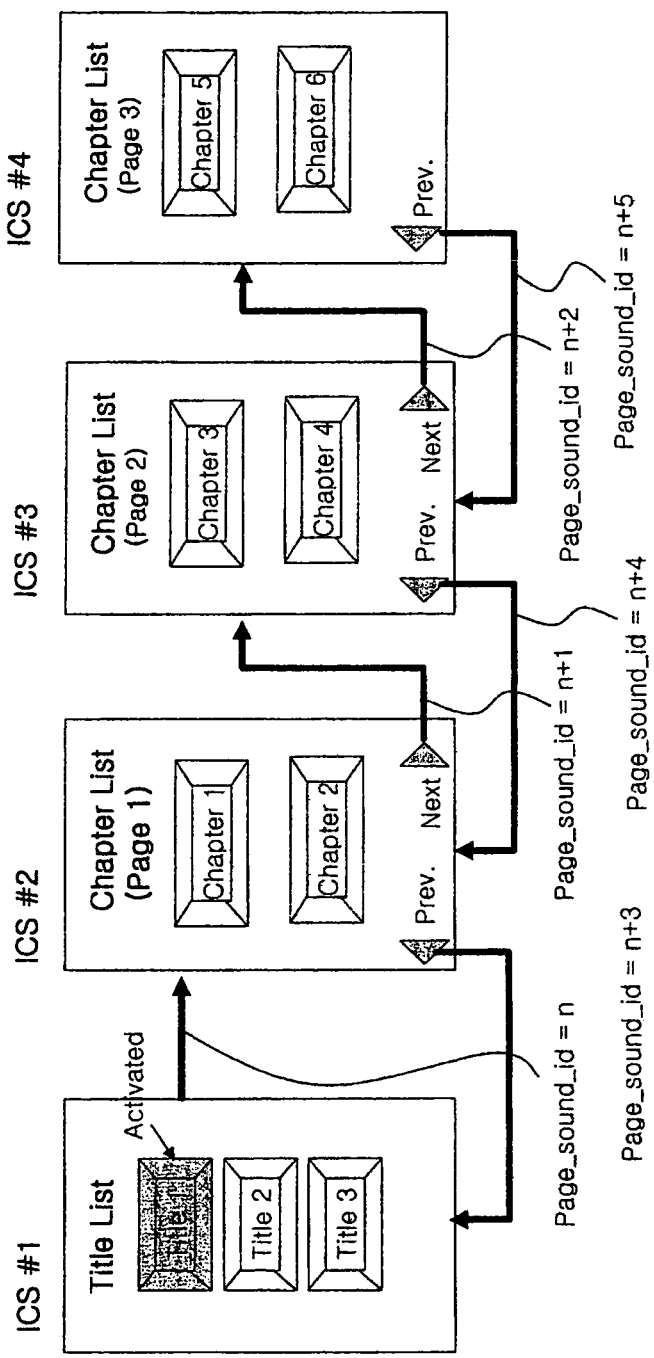
FIG. 5 illustrates the interrelationship between graphic pages reproduced using the management information provided by multiple ICSs according to an embodiment of the present invention.

FIG. 5 illustrates the interrelationship between graphic pages reproduced using the management information provided by multiple ICSs according to an embodiment of the present invention. More specifically, FIG. 5 illustrates a multi page menu for selecting a lower chapter menu from a title menu. Reproduction of each page image or menu page is managed by the information provided by one ICS. Accordingly, the four page images Title List, Chapter List (page 1), Chapter List (page 2) and Chapter List (page 3) are managed by ICS #1~ICS #4, respectively.

First of all, ICS #1 provides management information for reproducing an initial title menu having three title buttons Title #1, Title #2 and Title #3 on the screen. Once a user activates the Title #1 button, ICS #2 is accessed to reproduce the Chapter List (page 1) menu page, which has graphic buttons for Chapters #1 and #2 corresponding to the Title #1. This menu page also includes previous and next page buttons. If a next or previous page button is activated, ICS #3 or ICS #1 is accessed and the corresponding menu page reproduced using the management information in the accessed ICS. As shown in FIG. 5, the menu pages of ICS #3 and ICS #4 are configured in a similar manner to the menu page of ICS #2. Namely, ICS #3 is equipped with lower Chapters #3 and #4 corresponding to the Title #1, ICS #4 is equipped with lower Chapters #5 and #6 corresponding to the Title #1, and each of ICS #3 and ICS #4 has a next page button and/or a previous button. Although not shown in the drawing, a button enabling the menu page to directly move to ICS #1 from ICS #4 may exist in the menu page of ICS #3 or ICS #4.

As described above, a page sound may be associated with each page. Namely, when a menu page is reproduced, the sound data identified by the page_sound_id in the ICS is reproduced.

In an alternative embodiment each ICS includes sound information to provide a specific menu sound when moving between the menu pages. Here, the data structure may include separate page sound information indicating a sound data to reproduce for each moving direction between the respective pages; and thus, provide the user with the specific sound on moving to the corresponding page.

As a further alternative, an ICS may include sound information to reproduce different sound data for the cases of moving to a next page or moving to a previous page.

Figure 6:
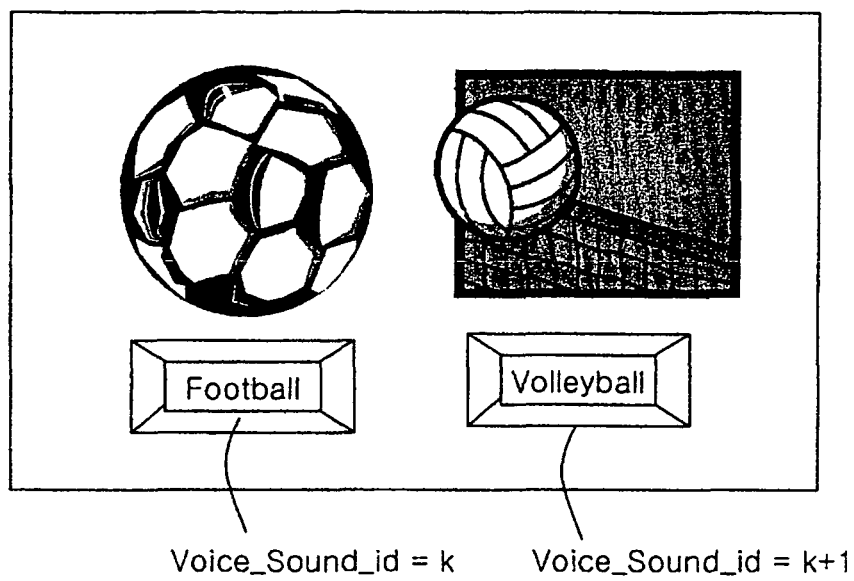
FIG. 6 illustrates an example of reproducing a voice sound using the data structure according to an embodiment of the present invention.

FIG. 6 illustrates an example of reproducing a voice sound using the data structure according to an embodiment of the present invention. When a user selects a specific button (selected state), a sound related to the function that would be executed if the selected button is activated may be reproduced. Namely, instead of providing a random sound having no relation to the function, the so called voice sound may be a human voice, comment, background music and the like associated with the function.

Hence, the voice sound may need to be played back for a time slightly longer than that of a button sound or page sound, as decided by a disk author. In one embodiment, the voice sound for each specific button is limited to a maximum five seconds.

Referring to FIG. 6, a menu enabling selection of a football game Football or volleyball game Volleyball is provided. Once a corresponding button is selected, a voice sound related to the execution of the corresponding button is provided. Thus, specific voice sound information voice_sound_id is given to each of the buttons and identifies the sound data of the voice sound to reproduce.

In this embodiment, the voice sound is provided when a button achieves a selected state and before a current button is activated, whereby the user may confirm his selection from the voice sound. However, in an alternative embodiment, the voice sound may be provided when a button is activated.

The menu sounds according to the embodiments of the present invention provide random sounds or voice sounds in selecting a button, moving between buttons, and turning a page, thereby enabling the user to utilize the menus more conveniently. Moreover, the menu sounds provide various menu sounds enabling a visually disabled user to utilize the optical disk conveniently.

Figure 7:
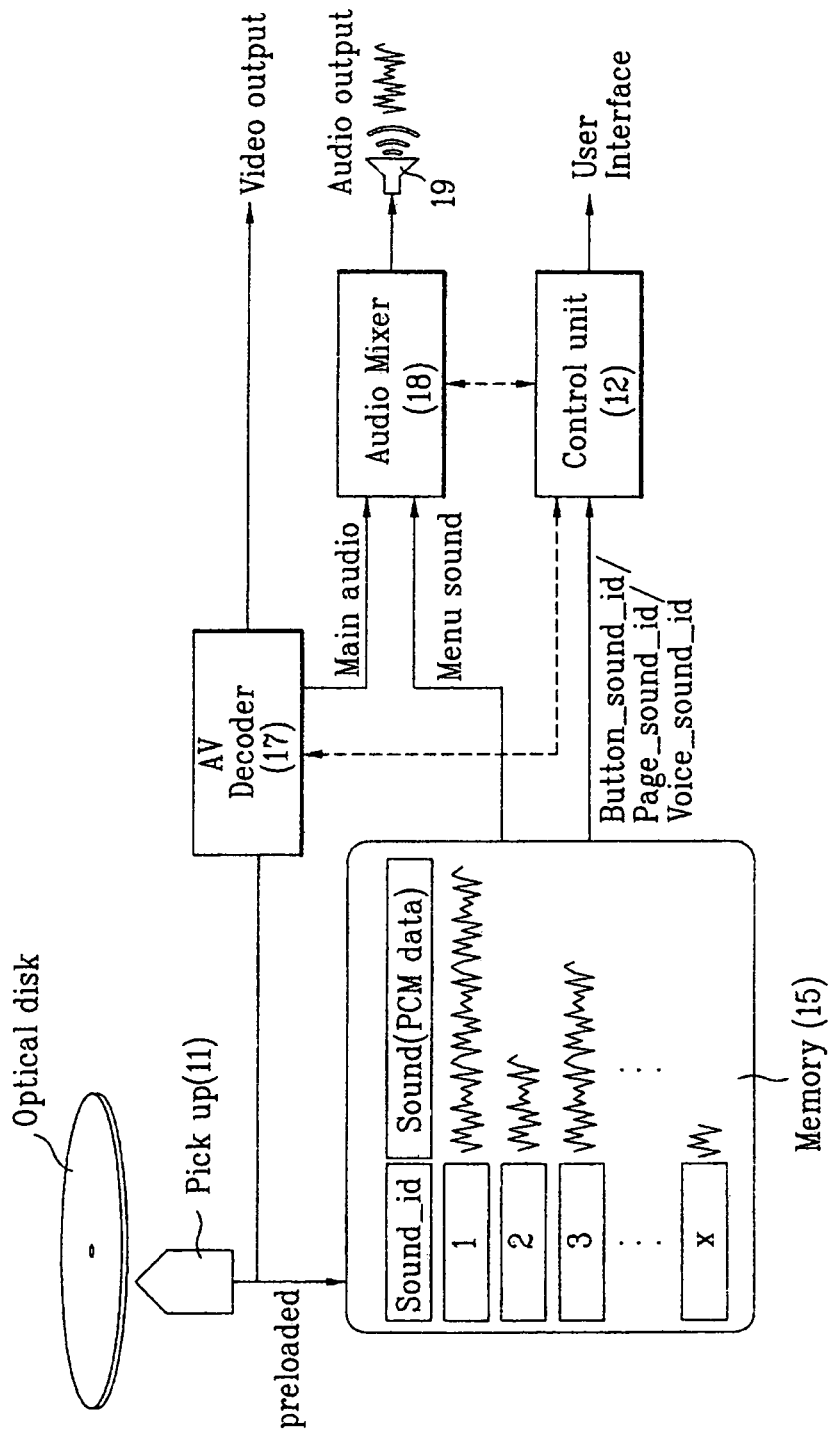
FIG. 7 is a schematic block diagram of an optical record playback apparatus according to an embodiment of the present invention.

FIG. 7 is a schematic block diagram of an optical record playback apparatus according to an embodiment of the present invention. As shown, once an optical disk is loaded, menu sound information and associated data recorded in the disk are reproduced by an optical pick up 11 and preloaded in a memory 15. The information stored in the memory 15 includes ICS information and the graphic and sound data identified by the graphic and sound information in the ICS.

The separate sound data such as button or page sound data are reproduced and stored in the memory 15 as PCM (pulse code modulation) data. The voice sound data is multiplexed with the interactive graphic stream and recorded in the AV stream file (*.m2ts). Consequently, the voice data is read out and temporarily stored in the memory 15 as well. The stored voice data will be provided if the corresponding button is selected.

Thereafter, a control unit 12 confirms the interaction of a user's menu selection behavior such as button execution, cursor movement between buttons, menu page turning and the like. Based on the user input, the control unit 12 accesses the appropriate sound information in the data structure of FIG. 3 to determine the identifier of the sound data for output. Using the accessed identifier, the control unit 12 controls the memory 15 to output the identified sound data to an audio output unit 19 via an audio mixer 18. The audio mixer 18 combines a main audio signal, transferred from an AV decoder 17, with the menu sound, transferred from the memory 15, and outputs the resulting audio signal to the audio output unit 19. Besides decoding the audio data from the main AV data, the AV decoder 17 also decodes and outputs the video data.

The memory 15 may be any type of storage device such as a RAM, buffer, etc. Hence, it will be apparent to those skilled in the art that the memory 15 may be replaced by a plurality of the storage devices of same or different types.

Figure 8:
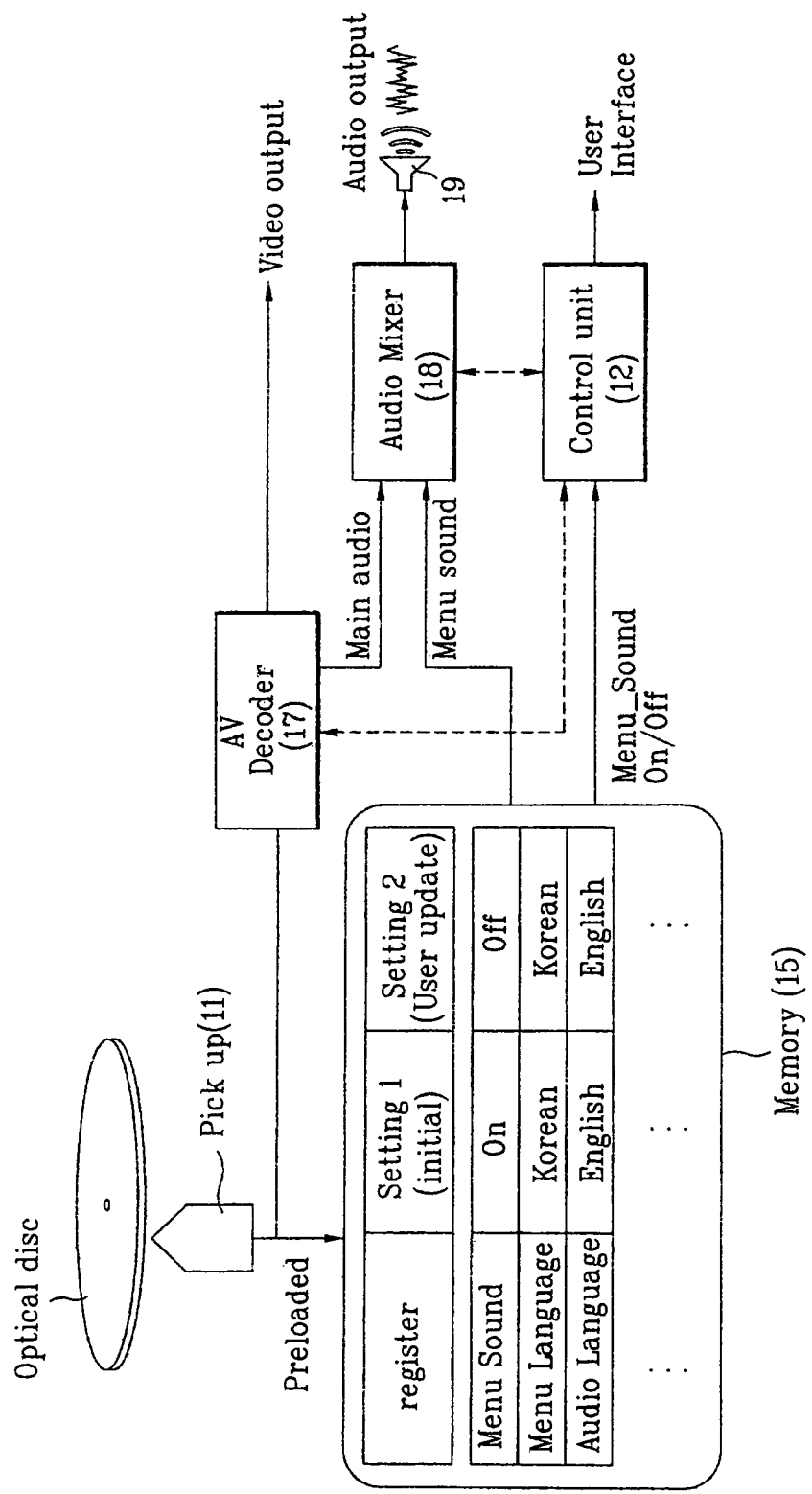
FIG. 8 is a schematic block diagram of an optical record playback apparatus enabling to modify a menu sound state according to the present invention.
Figure 9:
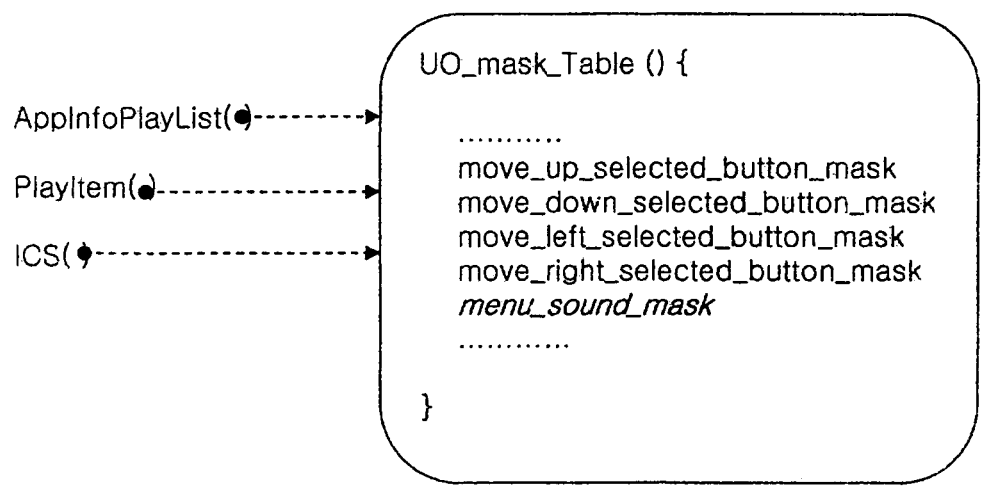
FIG. 9 illustrates the UO mask table UO_mask_Table mentioned above with respect to FIG. 3.

FIG. 8 and FIG. 9 are diagrams for explaining a method of enabling a menu sound to be turned on/off by a user or system according to the present invention. The on/off function of the menu sounds allows a user to turn off the menu sound function since the user may not want to hear the menu sounds. The on/off function also permits switching the menu sound to 'on' from the mode that the menu sounds are set to 'off'. Additionally, a disk author may set the menu sound function to 'off' during a specific playback section in recording data on a disk. And, a function that the system automatically turns off the menu sounds may be provided for the playback of the optical record playback apparatus as well.

FIG. 8 is a schematic block diagram of an optical record playback apparatus enabling to modify a menu sound state according to the present invention. The apparatus of FIG. 8 has the same structure as the apparatus of FIG. 7. Therefore, only the operative differences between these two embodiments will be described.

Referring to FIG. 8, once an optical disk is loaded, menu sound information and menu sound setup state information recorded in the optical disk are reproduced and preloaded in a memory 15. Namely, a playback setup state of the currently loaded optical disk is stored as specific register information, in which a menu sound state (Menu sound) is included therein.

If the optical record playback apparatus confirms from the loaded optical disk that the menu sound setup state is 'on', a corresponding register is set up to 'on'. If a command for turning off a menu sound is delivered from a user or system, the corresponding register is set to 'off' so that the menu sound is not provided any more on playback later.

FIG. 9 illustrates the UO mask table UO_mask_Table mentioned above with respect to FIG. 3. This table provides a data structure recorded on the optical disk for managing the menu sound setup state. The UO mask table may be included in each of AppInfoPlayList( ), PlayItem( ), ICS( ) and the like within a playlist. The 'UO_mask_Table' provides information indicating whether the user operation of turning menu sounds on/off is permitted. Hence, in order to permit or forbid that the user changes the menu sound setup state in a specific playback section, a disk author inserts 'menu_sound_mask' information in 'UO_mask_Table' indicating whether to permit to change the menu sound setup. Namely, a 'menu_sound_mask' field is provided in the 'UO_mask_Table'. A 'menu_sound_mask=O' is defined as a section permitting a change to the menu sound setup, and 'menu_sound_mask=1' is defined as a section forbidding change to the menu sound setup.

Moreover, 'menu_sound_on( )' and 'menu_sound_off( )' are newly defined as 'UO (user operation)' that is set up by the user or disk author so as to enable to be set up according to user's selection, or the disk author may set up a corresponding control state previously on manufacturing the disk.

FIG. 9 also illustrates some of the other fields in the UO mask table. As will be appreciated, these other fields indicate whether movement of a cursor or movement of which button is selected is permitted in a given direction or not.

On manufacturing the high density optical disk according to the present invention, the disk author uses the data structure of FIG. 9 to manage whether the user is permitted to change the menu sound setup, and may therefore, forbid the user from changing the menu sound setup on a specific playback section basis, whereby the menu sounds may be conveniently provided to the user in various ways.

Figure 10:
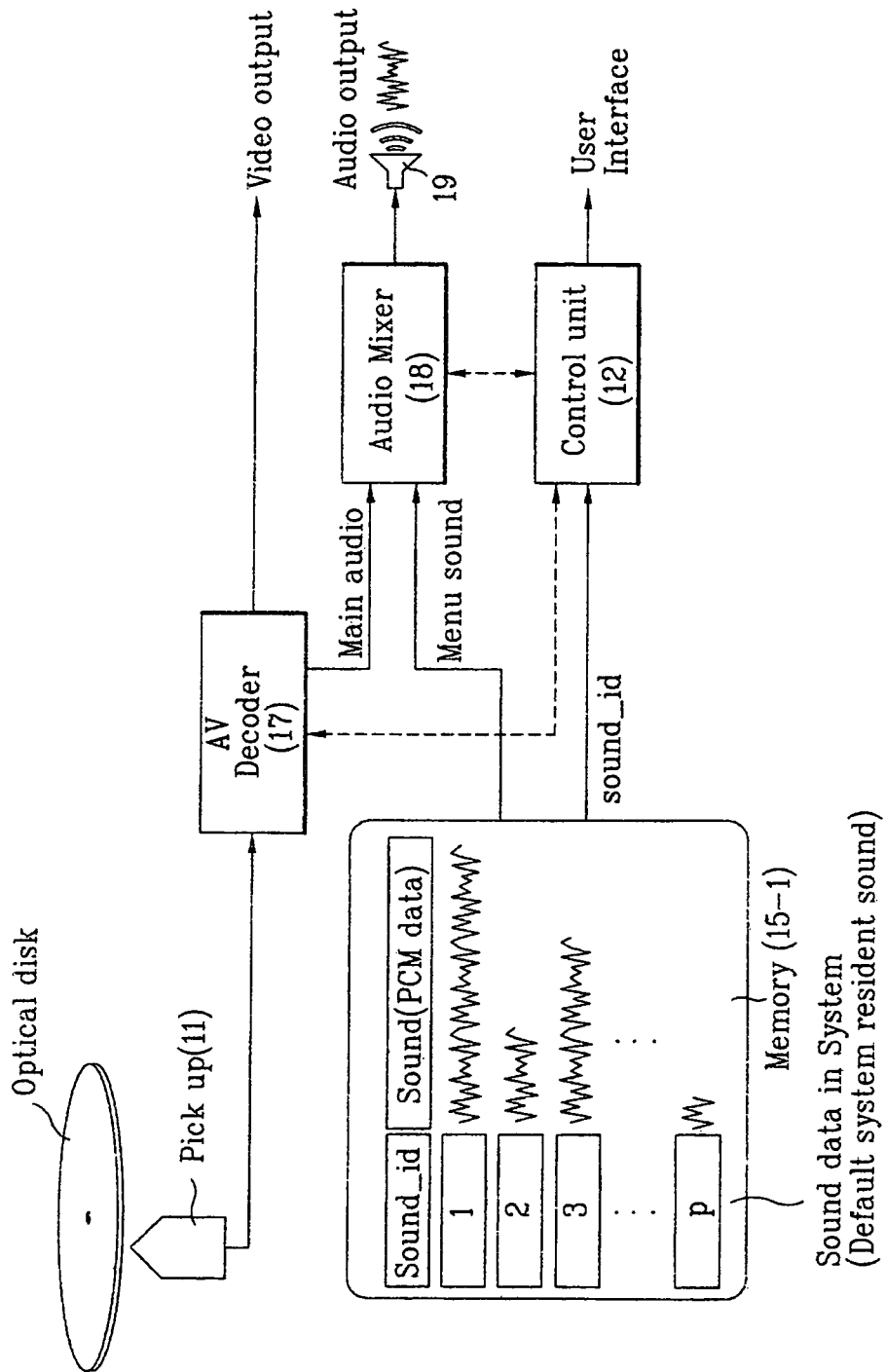
FIG. 10 is a block diagram showing a method for configuring a menu sound in an optical reproducing apparatus according to another embodiment of the present invention.

FIG. 10 is a block diagram showing a method for configuring a menu sound in an optical reproducing apparatus according to another embodiment of the present invention. The apparatus of FIG. 10 has the same structure as the apparatus of FIG. 7 except that the memory 15 has been replaced by a memory 15-1. Therefore, only the operative differences between these two embodiments will be described.

Referring to FIG. 10, a menu sound is generated using a system memory 15-1 when menu sound data related to menu sound information (e.g., sound_id) fails to exist in an optical disk or when only menu sound information exists in the optical disk.

In one example of this embodiment, menu sound information (e.g., sound_ids) is stored in an optical disk such as in the ICS of FIG. 3, but menu sound data related to the sound information is stored in the system memory 15-1 instead of being recorded in the disk. Consequently, the menu sound data corresponding to a user's button selection or page turning is output from the system memory 15-1 without having to be reproduced from the optical disk.

In another example of this embodiment, if no menu sound information (e.g., sound_ids) exists in the optical disk, the control unit 12 generates the menu sound information (e.g., sound_id) related to the user's menu selection, and the menu sound data corresponding to this generated menu sound information is then output from the system memory 15-1.

Therefore, a disk author may record menu sound information in the optical disk only and need not record the menu sound data therein, thereby having flexibility and convenience in manufacturing disks.

Figure 11:
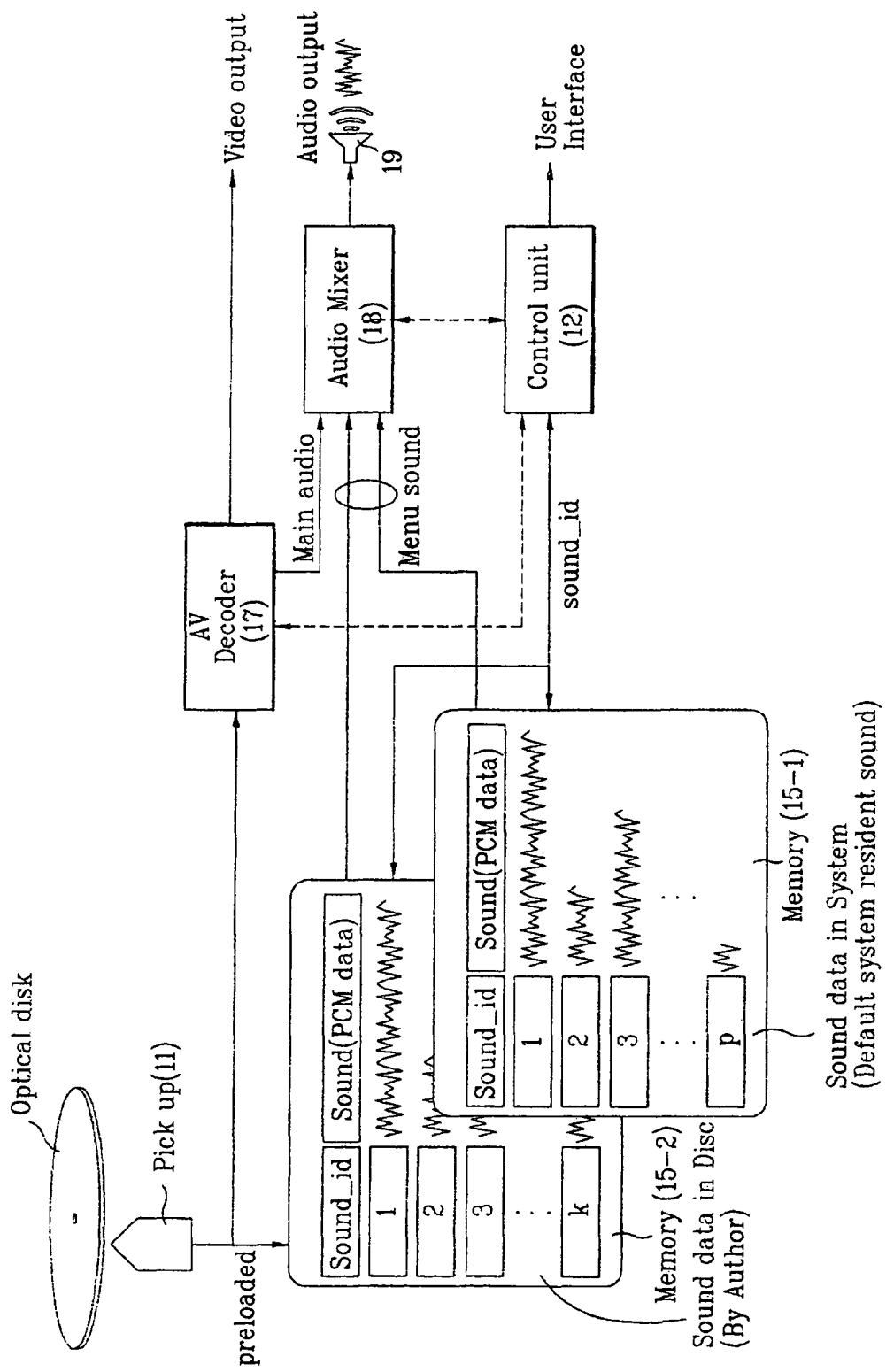
FIG. 11 is a block diagram showing a method for configuring a menu sound in an optical reproducing apparatus according to another embodiment of the present invention.

FIG. 11 is a block diagram showing a method for configuring a menu sound in an optical reproducing apparatus according to another embodiment of the present invention. The apparatus of FIG. 11 has the same structure as the apparatus of FIG. 7 except that the memory 15 has been replaced by a memory 15-1 and a memory 15-2. Therefore, only the operative differences between these two embodiments will be described.

In this embodiment, the memory 15-1 is the same as the memory 15-1 described above with respect to FIG. 10. Namely, the memory 15-1 stores sound data each having a predetermined sound identifier associated therewith. Furthermore, the memory 15-2 functions similarly to the memory 15 described above with respect to FIGS. 7 and 8. Namely, sound information and sound data reproduced from the optical disk are stored in the memory 15-2.

This embodiment allows a disk author to define menu sound information only so that a basic menu sound function utilizes the system memory 15-1 and the like within the optical record playback apparatus. Moreover, the disk author may directly define the menu sound information and data for various additional menu sounds failing to be supported by the system memory 15-1 and record this information and data in the optical disk.

Hence, if the optical disk in which the menu sound information and data, separately defined by the disk author, is loaded in the optical record playback apparatus including the system memory 15-1 that stores the menu sound data therein, the optical record playback apparatus temporarily stores the menu sound information and associated menu sound data, which are recorded in the optical disk, in a memory 15-2 to perform user's menu selection.

Namely, the menu sound corresponding to the user's menu selection is firstly provided from the memory 15-2 in which the menu sound information and data separately defined by the disk author are temporarily stored. Yet, if there exists no menu sound information and data defined by the disk author, the menu sound information stored in the system memory 15-1 will be provided.

For example, when the menu sound for activation of a current button is defined in the system memory 15-1 and the menu sounds for the movement between buttons and page turning are defined by the menu sound information and data separately defined by the disk author, the menu sound information defined in the system memory 15-1 is provided if a user clicks (activates) the current button. Yet, the menu sound defined in the memory 15-2 is provided on the move between buttons or page turning.

According to the above example, the basic menu sound information and data are provided by the system memory 15-1 only and other additional various menu sound information and data are separately defined by the disk author to be recorded in the disk, whereby a user's convenience is further enhanced.

While a pair of the memories 15-1 and 15-2 are shown in FIG. 11, it will be appreciated that a single memory may be used instead. And, it is apparent that the memories 15-1 and 15-2 may be implemented by separate independent memories as well as defined by separate types of memories, e.g., ROM and RAM, respectively. Moreover, although the separate kinds of menu sound information (e.g., sound_ids) respectively defined in the system memory 15-1 and the temporary storage memory 15-2 are shown in FIG. 11, the identical menu sound information may be defined in each of the memories 15-1 and 15-2. In this case, as mentioned in the foregoing description, the memory 15-2 temporarily storing the menu sound information and data defined by the disk author will be applied with priority. In other words, if sound information and/or sound data is reproduced from the disk and stored in the memory 15-2, then this information and data will be used instead of the data provided in the memory 15-1. However, if, for example, sound data is not reproduced and stored in the memory 15-2, then the sound data in the memory 15-1 is used.

Figure 12:
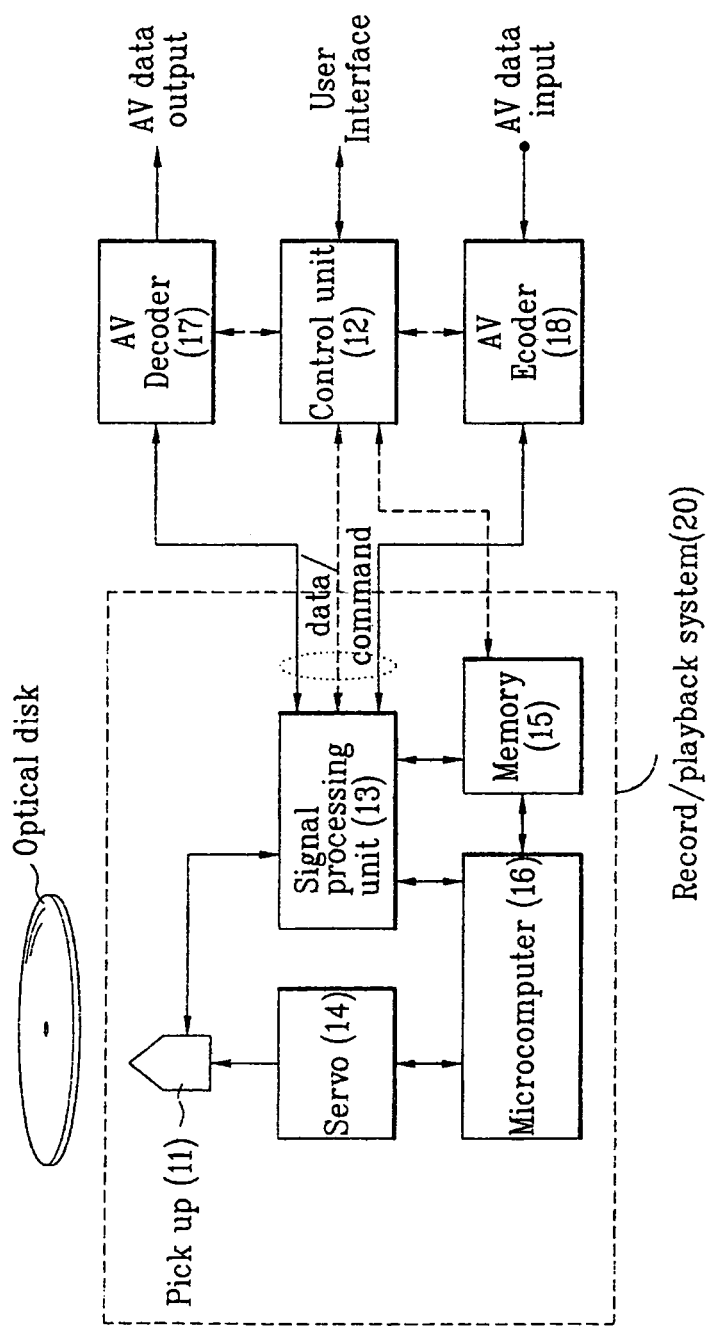
FIG. 12 is a detailed block diagram of an optical recording and reproducing apparatus according to the present invention.

FIG. 12 is a detailed block diagram of an optical recording and reproducing apparatus according to the present invention. As shown, the apparatus includes a pickup unit 11 reading out management information and data recorded in an optical disk, a servo 14 controlling the operation of the pickup unit 11, a signal processing unit 13 restoring a playback signal received from the pickup unit 11 into a wanted signal value or modulating a signal to be recorded in the optical disk, a memory 15 temporarily storing the management information such as the sound information and sound data as discussed above, and a microcomputer 16 controlling the operation of the servo 14, the signal processing unit 13 and the memory 15. The above discussed elements of the optical recording and reproducing apparatus may be called a record playback system 20.

An AV decoder 17 decodes output data according to the control of the control unit 12 to provide the decoded data to a user. In order to perform a function of recording a signal in the optical disk, an AV encoder 18 converts an input signal to a specifically formatted signal such as MPEG2 transport stream according to the control of the control unit 12, and provides the converted signal to the signal processing unit 13 of the record playback system 20.

The control unit 12, which is an element of controlling operations of the apparatus such as discussed in detail above, controls the record play back system 20 (and more specifically, the elements therein). For example the control unit 12 controls the read out of sound data corresponding to a menu selection made by a user from the memory, and then controls the output of the read-out sound data to the AV decoder 17. Because these operations have been discussed in detail above, such as with respect to FIGS. 3-11, a description thereof will not be repeated.

Moreover, in case of the embodiment of FIG. 10 or the embodiment of FIG. 11, it is apparent that the system memory 15-1 and the memory 15-2 temporarily storing the menu data preloaded from the disk will be utilized as the memory 15.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A computer readable recording medium storing an executable data structure for managing an interactive graphic stream, comprising:
   a main data file in which an AV stream and an interactive graphic stream are multiplexed, the interactive graphic stream including an interactive composition segment having graphic information for configuring an interactive graphic image, the interactive composition segment including,
   mask information indicating whether a user operation with respect to the interactive composition segment is forbidden, the mask information including sound mask information for indicating whether a sound-off user operation of the sound data is prohibited or not during the interactive display, and a button data structure providing reproduction management information for the interactive graphic image, the button data structure including,
　　a normal state information field including information for the normal state of the graphic image,
　　a selected state information field including information for the selected state of the graphic image, the selected state information field including a first identifier indicating first sound data to be reproduced when the interactive graphic image is selected, and
　　an activated state information field including information for the activated state of the graphic image, the activated state information field including a second identifier indicating second sound data to be reproduced when the interactive graphic image is activated; and
a sound file including the first and second sound data, each of the first and second sound data being represented by an associated sound identifier, the sound file being a separate file from the main data file.

2. The computer readable medium of claim 1, wherein the interactive graphic image is a graphic button.

3. The computer readable medium of claim 1, wherein the button structure further includes a neighbor information field providing reproduction management information for interactive graphic images neighboring the interactive graphic image, the neighbor information field indicating an upper interactive graphic image, a lower interactive graphic image, a left interactive graphic image and a right interactive graphic image of the interactive graphic image.

4. A method of reproducing data from a recording medium, the method comprising:
preloading a sound file recorded on the recording medium into a memory of a reproducing apparatus, the sound file including first and second sound data associated with an interactive graphic image included in an interactive graphic stream, the interactive graphic stream is multiplexed with an AV stream in a main data file recorded on the recording medium, each of the first and second sound data being represented by an associated sound identifier, the sound file being a separate file from the main data file;
reading an interactive composition segment included in the interactive graphic stream, the interactive composition segment including,
　　mask information indicating whether a user operation with respect to the interactive composition segment is forbidden, the mask information including sound mask information for indicating whether a sound-off user operation of the sound data is prohibited or not during the interactive display, and
　　a button data structure providing reproduction management information for the interactive graphic image, the button data structure including,
　　　　a normal state information field including information for the normal state of the graphic image,
　　　　a selected state information field including information for the selected state of the graphic image, the selected state information field including a first identifier indicating first sound data to be reproduced when the interactive graphic image is selected, and
　　　　an activated state information field including information for the activated state of the graphic image, the activated state information field including a second identifier indicating second sound data to be reproduced when the interactive graphic image is activated; and
reproducing one of the first and second sound data based on the state of the interactive graphic image.

5. The method of claim 4, wherein the first sound data is reproduced from the sound file when the interactive graphic image is changed to the selected state.

6. The method of claim 4, wherein the second sound data is reproduced from the sound file when the interactive graphic image is changed to the activated state.

7. The method of claim 4, wherein the button structure further includes a neighbor information field providing reproduction management information for interactive graphic images neighboring the interactive graphic image, the neighbor information field indicating an upper interactive graphic image, a lower interactive graphic image, a left interactive graphic image and a right interactive graphic image of the interactive graphic image.

8. The method of claim 4, wherein the interactive graphic image is reproduced in association with a main video data.

9. An apparatus for reproducing data recorded on a recording medium, the apparatus comprising:
a pickup unit configured to read data from the recording medium;
a memory configured to preload a sound file recorded on the recording medium, the sound file including first and second sound data associated with an interactive graphic image, each of the first and second sound data being represented by a an associated sound identifier included in the sound file, the sound file being a separate file from a main data file in which an AV stream and an interactive graphic stream are multiplexed, the interactive graphic stream including the interactive graphic image; and
a controller configured to
control reading of an interactive composition segment included in the interactive graphic stream associated with the interactive graphic image, the interactive composition segment including,
　　mask information indicating whether a user operation with respect to the interactive composition segment is forbidden, the mask information including sound mask information for indicating whether a sound-off user operation of the sound data is prohibited or not during the interactive display, and
　　a button data structure providing reproduction management information for the interactive graphic image, the button data structure including,
　　　　a normal state information field including information for the normal state of the graphic image,
　　　　a selected state information field including information for the selected state of the graphic image, the selected state information field including a first identifier indicating first sound data to be reproduced when the interactive graphic image is selected, and
　　　　a activated state information field including information for the activated state of the graphic image, the activated state information field including a second identifier indicating second sound data to be reproduced when the interactive graphic image is activated, and
control the pickup unit to reproduce one of the first and second sound data based on the state of the interactive graphic image.

10. The apparatus of claim 9, wherein the controller is configured to control the first sound data to be reproduced when the interactive graphic image is changed to the selected state.

11. The apparatus of claim 9, wherein the controller is configured to control the second sound data to be reproduced when the interactive graphic image is changed to the activated state.

12. The apparatus of claim 9, wherein the button structure further includes a neighbor information field providing reproduction management information for interactive graphic images neighboring the interactive graphic image, the neighbor information field indicating an upper interactive graphic image, a lower interactive graphic image, a left interactive graphic image and a right interactive graphic image of the interactive graphic image.

13. The apparatus of claim 9, wherein the controller controls the interactive graphic image to be reproduced in association with a main video data.

14. The apparatus of claim 9, wherein the controller reads the sound mask information in case that a user inputs a sound off command.

15. The computer readable medium of claim 3, wherein the mask information includes,
   first mask information indicating whether a move up user operation changing selected state of the interactive graphic image to the upper interactive graphic image is prohibited or not during the interactive display,
   second mask information indicating whether a move down user operation changing selected state of the interactive graphic image to the lower interactive graphic image is prohibited or not during the interactive display,
   third mask information indicating whether a move left user operation changing selected state of the interactive graphic image to the left interactive graphic image is prohibited or not during the interactive display, and
   fourth mask information indicating whether a move right user operation changing selected state of the interactive graphic image to the right interactive graphic image is prohibited or not during the interactive display.

16. The method of claim 7, wherein the mask information includes,
   first mask information indicating whether a move up user operation changing selected state of the interactive graphic image to the upper interactive graphic image is prohibited or not during the interactive display,
   second mask information indicating whether a move down user operation changing selected state of the interactive graphic image to the lower interactive graphic image is prohibited or not during the interactive display,
   third mask information indicating whether a move left user operation changing selected state of the interactive graphic image to the left interactive graphic image is prohibited or not during the interactive display, and
   fourth mask information indicating whether a move right user operation changing selected state of the interactive graphic image to the right interactive graphic image is prohibited or not during the interactive display.

17. The apparatus of claim 12, wherein the mask information includes,
   first mask information indicating whether a move up user operation changing selected state of the interactive graphic image to the upper interactive graphic image is prohibited or not during the interactive display,
   second mask information indicating whether a move down user operation changing selected state of the interactive graphic image to the lower interactive graphic image is prohibited or not during the interactive display,
   third mask information indicating whether a move left user operation changing selected state of the interactive graphic image to the left interactive graphic image is prohibited or not during the interactive display, and
   fourth mask information indicating whether a move right user operation changing selected state of the interactive graphic image to the right interactive graphic image is prohibited or not during the interactive display.

* * * * *